(12) United States Patent
Kim et al.

(10) Patent No.: US 11,021,396 B2
(45) Date of Patent: Jun. 1, 2021

(54) MODIFIED NONVOLATILE COLD ASPHALT BINDER AND RECYCLED ASPHALT MIXTURE USING THEREOF

(71) Applicant: HANSOO NATECH CO., LTD., Daejeon (KR)

(72) Inventors: Young Ik Kim, Daejeon (KR); Young Sang Kim, Daejeon (KR); Jeong Ho Park, Daejeon (KR)

(73) Assignee: HANSOO NATECH CO., LTD., Daejeon (KR)

( * ) Notice: Subject to any disclaimer, the term of this patent is extended or adjusted under 35 U.S.C. 154(b) by 375 days.

(21) Appl. No.: 16/095,249

(22) PCT Filed: Jul. 28, 2017

(86) PCT No.: PCT/KR2017/008164
§ 371 (c)(1),
(2) Date: Oct. 19, 2018

(87) PCT Pub. No.: WO2018/026140
PCT Pub. Date: Feb. 8, 2018

(65) Prior Publication Data
US 2020/0199024 A1 Jun. 25, 2020

(30) Foreign Application Priority Data
Aug. 2, 2016 (KR) .................. 10-2016-0098354

(51) Int. Cl.
| | |
|---|---|
| C04B 26/26 | (2006.01) |
| C04B 24/26 | (2006.01) |
| C04B 24/34 | (2006.01) |
| C04B 24/36 | (2006.01) |
| C09K 8/56 | (2006.01) |
| E01C 7/20 | (2006.01) |
| E01C 7/26 | (2006.01) |

(52) U.S. Cl.
CPC .......... *C04B 26/26* (2013.01); *C04B 24/2641* (2013.01); *C04B 24/2676* (2013.01); *C04B 24/2688* (2013.01); *C04B 24/34* (2013.01); *C04B 24/36* (2013.01); *C09K 8/56* (2013.01); *E01C 7/20* (2013.01); *E01C 7/265* (2013.01)

(58) Field of Classification Search
None
See application file for complete search history.

(56) References Cited

U.S. PATENT DOCUMENTS

| | | | | |
|---|---|---|---|---|
| 5,047,457 A * | 9/1991 | Higgins | .................. | C08L 95/00 524/60 |
| 5,331,028 A * | 7/1994 | Goodrich | ................ | C08L 95/00 524/59 |
| 5,451,621 A * | 9/1995 | Usmani | .................... | C08L 95/00 524/68 |
| 5,638,498 A * | 6/1997 | Tyler | ...................... | G06K 15/00 358/1.16 |
| 5,891,224 A * | 4/1999 | Aoyama | ................ | C08L 95/005 106/2 |
| 5,973,037 A * | 10/1999 | Fields | ...................... | C08L 95/00 524/59 |
| 6,503,968 B1 * | 1/2003 | Kim | .......................... | C08L 9/08 524/1 |
| 6,972,047 B2 * | 12/2005 | Butler | ...................... | C08L 95/00 106/278 |
| 7,642,302 B2 * | 1/2010 | Hergenrother | .......... | C08L 95/00 524/68 |
| 2011/0165376 A1 * | 7/2011 | Whitaker | ............ | C04B 20/1025 428/148 |

FOREIGN PATENT DOCUMENTS

| | | |
|---|---|---|
| KR | 10-2005-0074414 A | 7/2005 |
| KR | 10-2006-0111942 A | 10/2006 |
| KR | 10-0795388 B1 | 1/2008 |
| KR | 10-0986718 B1 | 10/2010 |
| KR | 10-1672823 B1 | 11/2016 |

OTHER PUBLICATIONS

International Search Report of corresponding Patent Application No. PCT/KR2017/008164—4 pages (dated Nov. 29, 2017).

\* cited by examiner

*Primary Examiner* — John J Figueroa
(74) *Attorney, Agent, or Firm* — Knobbe Martens Olson & Bear, LLP

(57) ABSTRACT

A nonvolatile cold modified asphalt binder and a nonvolatile cold recycled asphalt mixture using the same are manufactured by optimally mixing a petroleum asphalt, a native asphalt, a polymer modifier, process oil, and an adhesive strength enhancer. The nonvolatile cold modified asphalt binder includes at least one petroleum asphalt selected from a straight asphalt or a blown asphalt; at least one native asphalt selected from gilsonite, glance pitch, and grahamite; a rubber-modified-compound (RMC) polymer modifier which is a vinyl aromatic hydrocarbon-conjugated diene block copolymer including at least one of a styrene-butadiene block copolymer (SBS), a styrene-isoprene block copolymer (SIS), and a styrene-ethylene-butylene block copolymer (SEBS); at least one process oil selected from paraffin oil, naphthenic oil, aromatic oil, natural oil, and mineral oil; and at least one adhesive strength enhancer selected from rosin esters, modified acryls, modified silicones, polyvinyl esters, and silicone resins.

4 Claims, No Drawings

MODIFIED NONVOLATILE COLD ASPHALT BINDER AND RECYCLED ASPHALT MIXTURE USING THEREOF

TECHNICAL FIELD

The present invention relates to a modified nonvolatile cold asphalt binder and a recycled nonvolatile cold asphalt mixture using thereof.

BACKGROUND ART

90% or more of the domestic road pavement is a concrete or asphalt pavement, but the durability and persisting period are greatly reduced due to plastic deformation and cracking of the road according to an increase in traffic volume and heavy vehicles. Due to local downpours, heavy snowfall, or global warming, paved roads and sidewalks are in a much worse environment than the past, such as an increase in road surface temperature and an increase in the amount of calcium chloride that is used. Accordingly, damage such as cracks, breakage, and abrasion is accelerating.

In order to repair concrete or asphalt pavement, there are an overlaying method and full and partial cutting overlaying method. However, environmental problems and an increase in disposal costs have arisen due to the generation and disposal of waste according to road surface crushing and cutting in the related art.

In addition to the overlaying method and the cutting overlaying method, a cold asphalt mixture is used in order to repair an asphalt paved road. As a binder of a current cold asphalt mixture, a cutback asphalt containing a volatile solvent or an emulsified asphalt obtained by modifying an asphalt using an emulsifier is mainly used. Specific examples of the cold asphalt mixture are as follows in (A) to (E).

(A) A cold asphalt mixture using an emulsified asphalt, a modified emulsified asphalt binder (cationic or anionic), or a cutback asphalt, and an inorganic binder such as cement, fly ash, blast furnace slag powder, limestone, and an early curing agent.

(B) A cold asphalt mixture using an emulsified asphalt or a modified emulsified asphalt binder (cationic, anionic, or water-vaporization type), and a polymer-based modifying additive such as EVA, acrylic polymer, polyvinyl acetate, and acrylic emulsion, a surfactant, and a binder.

(C) A cold recycled asphalt mixture manufactured by mixing an emulsified asphalt or a modified emulsified asphalt binder, a modifying additive, a regenerating additive (vegetable oil, base oil, emulsion, or non-heating oil-in-water type), a fiber additive, and a recycled aggregate.

(D) A cold recycled asphalt mixture manufactured by mixing a polymer-based binder (polyurethane or aqueous polyacrylic binder) with an aggregate.

(E) A cold asphalt binder manufactured by mixing a straight asphalt, a solvent, a petroleum resin, a vehicle, and a crosslinking accelerator, and a cold asphalt mixture using the same.

The problems of the conventional cold asphalt binder or cold asphalt mixture are as follows.

① Problems of Emulsified Asphalt or Modified Emulsified Asphalt-Based Cold Asphalt Emulsified asphalt means an asphalt containing an emulsifier so as to remain in a dispersed state without undergoing phase separation in water. Since water is added so that the asphalt which is in a semi-solid state at room temperature is maintained in a liquid state at room temperature, the physical properties (penetration, softening point, peel resistance, moisture resistance, or elongation) thereof are lowered compared to a straight asphalt.

In order to overcome the disadvantages of a general emulsified asphalt, the modified emulsified asphalt was manufactured by adding latex and rubber-based modifiers. The modified emulsified asphalt has greatly improved physical properties compared to general emulsified asphalt, but fails to satisfy the essential physical properties of an asphalt binder. That is, a cold asphalt mixture using emulsified asphalt or modified emulsified asphalt is not excellent in mechanical properties such as Marshall stability, falling-off resistance, and indirect tensile strength.

In order to improve the strength properties of emulsified asphalt and modified emulsified asphalt, an inorganic binder is used in combination. In this case, there is a merit in terms of strength but the asphalt is very vulnerable to fatigue properties and low-temperature cracking because it reduces the inherent ductility property of the asphalt. Accordingly, continuous maintenance is required. Further, the use of an inorganic binder such as cement causes a structural problem in that waste asphalt cannot be recycled during cutting for re-pavement.

② Problems of Cut-Back Asphalt-Based Cold Asphalt

Asphalt cement is in a semi-solid state at room temperature. Accordingly, a substance in a liquid state manufactured by mixing the asphalt cement with a volatile petroleum solvent so that it can be used without heating at room temperature is called cutback asphalt. Drying and curing speeds of cutback asphalt by vaporization depend on the type of solvents used in mixing, and cutback asphalt is classified into rapid curing (RC), medium curing (MC), and slow curing (SC) types. Gasoline, kerosene, and light oil are generally used for cutback asphalt. Since a volatile solvent is used in cutback asphalt, the mechanical properties of the asphalt are reduced due to the solvent that is not volatilized. In particular, the use of the volatile solvent makes the storage stability and long-term storage property very poor. Frequently, curing occurs due to vaporization of the volatile solvent during storage, which precludes the use of the cutback asphalt.

③ Problems of Polymer-Based Cold Asphalt

The use of the polymer provides mechanical properties that are superior to those of the emulsified asphalt-based cold asphalt. However, due to the high tackiness and moisture sensitivity of polymers, the storage stability and long-term storage property are very poor. In the case where moisture is present in the aggregate, the curing of the polymer is delayed, which greatly reduces the strength. Further, when the polymer-based cold asphalt is applied to an asphalt repair section exposed to a wet environment, the use thereof is greatly restricted due to an un-curing reaction caused by water. In addition, the effect of the air temperature on construction is large, and the polymer-based cold asphalt becomes impossible to use when the temperature decreases in winter. Considering that it is mainly used in rainy seasons and winter seasons due to the characteristics of the cold asphalt, the polymer-based cold asphalt is not suitable as the cold asphalt.

④ Cold Asphalt Binder and Mixture (Same as Cutback Asphalt) Manufactured by Using a Solvent in Straight Asphalt The binder and mixture are a kind of a cutback asphalt using a solvent to impart fluidity to a straight asphalt at room temperature. The binder and mixture have the same problems as the cutback asphalt-based cold asphalt mixture described in the above ②.

DISCLOSURE

Technical Problem

An object of the present invention is to solve problems, such as: deterioration of physical properties such as mechanical properties, a reduction in storage stability and long-term storage property, curing caused by volatilization of volatile solvents, and the impossibility of the use in rainy weather or in winter, which are problems of a conventional cold asphalt binder and cold asphalt mixture, and is to provide a nonvolatile cold modified asphalt binder and a cold recycled asphalt mixture which are excellent in physical properties, long-term storage, and stability, and which can be used in rainy weather or in winter.

Technical Solution

The present inventors have conducted studies over a long period of time to solve the above problems, and have invented a cold recycled asphalt mixture having significantly improved storage stability and storage properties using a nonvolatile cold modified asphalt binder which is manufactured by optimally mixing a petroleum asphalt, a native asphalt, a polymer modifier, process oil, and an adhesive strength enhancer.

Resolving of the problems of the conventional cold asphalt binder and the cold asphalt mixture by the present inventors will be examined in detail.

In the present invention, the petroleum asphalt and the native asphalt are used as a main component of the binder to thus provide the inherent ductility characteristic of asphalt, and the polymer modifier and the adhesive strength enhancer are mixed to thus improve mechanical properties.

Further, in the present invention, paraffin oil and vegetable oil are appropriately mixed so that the petroleum asphalt and the native asphalt are maintained in a liquid state at room temperature. In particular, blending is performed so that the polymer modifier applied to improve the mechanical properties is not separated from the asphalt at room temperature. Further, a volatile solvent is excluded from mixing of the cold asphalt binder in order to secure long-term storage stability.

Further, in the present invention, an inorganic binder such as cement, limestone, and slag is mixed in order to supplement the low mechanical properties of the emulsified asphalt series which are mainly used as the cold asphalt binder, and a general petroleum asphalt and native asphalt are selected as a main component of the binder in order to overcome the disadvantage of hardening of asphalt pavement. A polymer specialized for asphalt modification is used in order to improve the mechanical properties.

Further, the conventional cold asphalt is an emulsified asphalt, a cutback asphalt, and a polymer-based cold asphalt, and is greatly affected by temperature and climate during construction when applied to the field. When excessive moisture is present in an application field, elimination occurs due to the delay of curing and a reduction in resistance to moisture. When the temperature is low in winter, the sufficient durability is not ensured due to the undeveloped strength caused by un-curing. However, the present invention is a modified asphalt series obtained by modification using a general petroleum asphalt and native asphalt, and the same strength as the general asphalt is exhibited at room temperature. Since a volatile solvent and a curable polymer are not used as the binder, the modified asphalt of the present invention can be used in all weather regardless of moisture and climate when applied to the field.

Hereinafter, a method for solving the problem will be examined in more detail.

Generally, the asphalt and the modified asphalt improved therefrom are present in a semi-solid state at room temperature, and are necessarily heated to a temperature of 160° or more for use. Two methods are used in order to use the asphalt at room temperature. In one method, the asphalt is used in the form of emulsified asphalt or cutback asphalt modified with an emulsifier such as water, kerosene, or light oil, and in the other method, a cold type polymer binder is used. In the present invention, process oil is used instead of a general emulsifier and cold type polymer binder, thereby manufacturing a cold type modified asphalt.

As the main raw material of the cold type modified asphalt binder of the present invention, petroleum asphalt and native asphalt are used. The petroleum asphalt is an asphalt remaining after distilling of petroleum and extraction of components such as gasoline, naphtha, and kerosene having a low boiling point. There are two types as the petroleum asphalt, and examples thereof include a straight asphalt and a blown asphalt. The petroleum asphalt becomes liquid at high temperatures and is highly hardened at low temperatures. The thermo-sensitivity thereof depends on the type of asphalt. The petroleum asphalt is rich in plasticity, has high water repellency, electric insulation, and adhesion properties, and is chemically stable.

The native asphalt having a melting point higher than that of general asphalt is also called asphaltite. Examples of the native asphalt include gilsonite, glance pitch, and grahamite. In particular, gilsonite has been produced for commercial purposes since 1885, and includes natural hydrocarbons. Gilsonite includes components of 71% of asphaltene and 27% of malathene, and chemically includes 3.2% of nitrogen and 0.3% of sulfur.

The petroleum asphalt and the native asphalt are mixed to thus prevent deformation caused by excessive softening of the binder at high temperatures in summer and also prevent elimination caused by deterioration of adhesion with aggregates when applied to the field. When the petroleum asphalt or the native asphalt is used in an amount of less than 0.1 wt %, the inherent softening of the paved asphalt may not be exhibited due to the insufficient amount of asphalt in the nonvolatile cold modified asphalt. When the petroleum asphalt or the native asphalt is used in an amount of more than 30 wt %, since the viscosity of the nonvolatile cold modified asphalt binder is largely increased, the nonvolatile cold modified asphalt binder cannot be maintained in a liquid state at room temperature. Accordingly, it is difficult to produce the cold asphalt at room temperature, and it is impossible to store the cold asphalt over a long period of time at room temperature because of the poor storage stability and storage property after the cold asphalt is manufactured.

In general, since the petroleum asphalt and the native asphalt have a low penetration and softening point, the petroleum asphalt and the native asphalt are vulnerable to plastic deformation at high temperatures and to cracking at low temperatures. In order to improve the mechanical properties of the cold asphalt binder using the petroleum asphalt and the native asphalt as main materials at high and low temperatures, the present inventors used a modifier having excellent compatibility with the asphalt. The modifier of the present invention is a rubber-modified-compound (RMC) polymer modifier which is a vinyl aromatic hydrocarbon-conjugated diene block copolymer including at least one of a styrene-butadiene block copolymer (SBS), a styrene-isoprene block copolymer (SIS), and a styrene-ethylene-butylene block copolymer (SEBS). The amount of the rubber-modified-compound polymer modifier is preferably in the range of 0.1 to 15 wt % based on 100 wt % of the nonvolatile cold modified asphalt binder. When the amount is less than 0.1 wt %, the modifying effect is not sufficient, and when the amount is more than 15 wt %, since the viscosity of the nonvolatile modified asphalt binder is largely increased at room temperature, the nonvolatile modified asphalt binder cannot be maintained in a liquid state at room temperature. Accordingly, it is impossible to produce the cold recycled asphalt mixture at room temperature, and it is difficult to store the cold recycled asphalt mixture over a long period of time and to apply the cold recycled asphalt mixture to the field at room temperature because of the high viscosity and self-adhesion even after the cold recycled asphalt mixture is manufactured.

Since the petroleum asphalt, the native asphalt, and the modified asphalt binder improved therefrom are in a semi-solid state at room temperature, it is impossible to perform mixing with aggregates at room temperature for the purpose of the use thereof. Therefore, application of the process oil thereto reduces the viscosity of the asphalt binder and increases the adhesion of the binder. In addition, the process oil is adsorbed onto the old asphalt binder contained in the recycled asphalt aggregate, thereby eluting the asphalt binder and imparting swelling properties thereto. The process oil is selected from paraffin oil, naphthenic oil, aromatic oil, and mineral oil for use. The amount of the process oil is in the range of 20 to 50 wt % based on 100 wt % of the cold modified asphalt binder. When the process oil is used in an amount of less than 20 wt %, the viscosity of the asphalt binder is not sufficiently lowered or the adhesion of the binder is not sufficiently increased, sufficient elution of the recycled asphalt binder is not ensured, and sufficient swelling properties are not imparted. When the process oil is used in an amount of more than 50 wt %, the viscosity of the asphalt binder may be very low to cause plastic deformation of the cold asphalt or to soften the binder at high temperatures in summer.

Further, in the present invention, the adhesive strength enhancer applied to the asphalt binder is used to increase the adhesion between aggregates or between the aggregates and the asphalt, thus preventing early elimination, increasing the adhesive strength, and providing the increased thermo-sensitivity to an expandable binder component, whereby plastic deformation and cracking according to the temperature are prevented. The adhesive strength enhancer is at least one selected from rosin esters, modified acryls, modified silicones, polyvinyl esters, and silicone resins. The adhesive strength enhancer is used in an amount of 0.5 to 30 wt %. When the adhesive strength enhancer is used in an amount of less than 0.5 wt %, the adhesive strength is not sufficiently increased. When the adhesive strength enhancer is used in an amount of more than 30 wt %, since an initial adhesive strength is increased, workability is reduced when applied to the field due to the adhesion between the aggregates in storage.

Advantageous Effects

A nonvolatile cold recycled asphalt mixture including a nonvolatile cold recycled asphalt binder of the present invention has excellent mechanical properties such as Marshall stability and dynamic stability and also has excellent adhesion to an asphalt upper plate or concrete upper plate. The adhesion is remarkably excellent even in a moisture state.

In addition, the nonvolatile cold recycled asphalt mixture including the nonvolatile cold recycled asphalt binder of the present invention does not include volatile components and inorganic binders, and the storage period thereof is at least two years and is very stable.

Therefore, the nonvolatile cold recycled asphalt binder of the present invention and the asphalt mixture including the same can be stored over a long period of time, and can be used for pavement even in a state where humidity is high or in a moisture state.

Best Mode

The present invention relates to a nonvolatile cold modified asphalt binder including:
A) 0.1 to 30 wt % of a petroleum asphalt;
B) 0.1 to 30 wt % of a native asphalt;
C) 0.1 to 15 wt % of a rubber-modified-compound (RMC) polymer modifier which is a vinyl aromatic hydrocarbon-conjugated diene block copolymer including at least one of a styrene-butadiene block copolymer (SBS), a styrene-isoprene block copolymer (SIS), and a styrene-ethylene-butylene block copolymer (SEBS);
D) 20 to 50 wt % of a process oil; and
(E) 0.5 to 30 wt % of an adhesive strength enhancer.

The nonvolatile cold modified asphalt binder is manufactured via steps of a) preparing the petroleum asphalt and the native asphalt by heating to 160 to 170° C.;
b) adding the rubber-modified-compound polymer modifier of C) to the heated petroleum asphalt and native asphalt and performing stirring in a batch plant at a temperature of 170 to 180° C. for three hours or more, thus manufacturing a modified asphalt;
c) adding the adhesive strength enhancer to the modified asphalt and performing stirring at a temperature of 170 to 180° C. for one hour or more;
d) adding the process oil to the modified asphalt containing the adhesive strength enhancer obtained during step c) and performing stirring at a temperature of 170 to 180° C. for one hour or more; and
e) cooling a mixture after step d), thus manufacturing the cold modified asphalt binder.

Further, the present invention relates to the nonvolatile cold modified asphalt binder in which the native asphalt is at least one selected from gilsonite, glance pitch, and grahamite.

Further, the present invention relates to the nonvolatile cold modified asphalt binder in which the process oil is at least one selected from paraffin oil, naphthenic oil, aromatic oil, natural oil, and mineral oil.

Further, the present invention relates to the nonvolatile cold modified asphalt binder in which the adhesive strength enhancer is at least one of rosin esters, modified acryls, modified silicones, polyvinyl esters, and silicone resins.

Further, the present invention relates to a nonvolatile cold recycled asphalt mixture including 1 to 3 wt % of a nonvolatile cold modified asphalt binder; 93 to 97 wt % of a recycled aggregate; and 2 to 4 wt % of a filler. The cold asphalt binder includes 0.1 to 30 wt % of a petroleum asphalt; 0.1 to 30 wt % of a native asphalt; 0.1 to 15 wt % of a rubber-modified-compound (RMC) polymer modifier which is a vinyl aromatic hydrocarbon-conjugated diene block copolymer including at least one of a styrene-butadiene block copolymer (SBS), a styrene-isoprene block copolymer (SIS), and a styrene-ethylene-butylene block copolymer (SEBS); 20 to 50 wt % of a process oil; and 0.5 to 30 wt % of an adhesive strength enhancer.

Further, the present invention relates to the nonvolatile cold recycled asphalt mixture which is packed in a paper bag package, a paper box package, a tonne bag package, or a nonwoven-pack package.

Further, the present invention relates to the nonvolatile cold recycled asphalt mixture which is applied to a sidewalk, a bicycle road, or a walkway.

Further, the present invention relates to the nonvolatile cold recycled asphalt mixture in which a pigment is added to the nonvolatile cold recycled asphalt mixture to express colors on a road surface.

Mode for Invention

Hereinafter, the constitution of the present invention will be described in more detail with reference to specific embodiments. However, it should be apparent to those skilled in the art that the scope of the present invention is not limited to the description of the embodiments.

Manufacturing of Nonvolatile Cold Modified Asphalt Binder 0.1 to 30 wt % of each of a petroleum asphalt and a native asphalt was heated to 160 to 170° C. 0.1 to 15 wt % of an RMC polymer modifier was added to a mixture of the heated petroleum asphalt and native asphalt, and stirring was performed in a batch plant at a temperature of 170 to 180° C. for 3 hours or more. 0.5 to 30 wt % of an adhesive strength enhancer was added to the mixture thus obtained, and stirring was performed at a temperature of 170 to 180° C. for 1 hour or more. 20 to 50 wt % of process oil was added to the mixture containing the adhesive strength enhancer, and the resulting mixture was stirred at a temperature of 170 to 180° C. for 1 hour or more and then cooled, thus manufacturing a nonvolatile cold modified asphalt binder.

Manufacturing of Nonvolatile Cold Recycled Asphalt Mixture 1 to 3 wt % of the nonvolatile cold modified asphalt binder, 93 to 97 wt % of a recycled aggregate, and 1 to 4 wt % of a filler were mixed to produce a nonvolatile cold recycled asphalt mixture at room temperature. Specific Examples 1 and 2 are described below.

EXAMPLE 1

3 wt % of a filler and 2 wt % of a nonvolatile cold modified asphalt binder were added to 95 wt % of a recycled asphalt aggregate at room temperature, and were mixed uniformly.

EXAMPLE 2

92 wt % of a recycled asphalt aggregate, 3 wt % of a virgin aggregate, 2 wt % of a filler, and 3 wt % of a nonvolatile cold modified asphalt binder were added at room temperature, and were mixed uniformly.

Comparative Example 1

6 wt % of a cutback asphalt binder (D company) heated to 50 to 60° C. was added to 91 wt % of a dried virgin aggregate and 3 wt % of a filler, and were mixed uniformly.

Comparative Example 2

7 wt % of an emulsified asphalt binder, 30 wt % of a virgin aggregate, 60 wt % of a recycled aggregate, and 3 wt % of a filler were added at room temperature, and were mixed uniformly.

Result

1) KS F 2337 Resistance test for plastic flow of bituminous mixture using Marshall tester

TABLE 1

| Item | Example 1 | Example 2 | Comparative Example 1 | Comparative Example 2 |
|---|---|---|---|---|
| Marshall stability (N) | 3,780 | 3,860 | 2,500 | 3,800 |
| Flow (1/100 cm) | 27 | 32 | 35 | 32 |
| Porosity (%) | 7.8 | 8.3 | 15.5 | 12.0 |
| Dynamic stability (times/mm) | 934 | 1,070 | 110 | 550 |

When the nonvolatile cold modified asphalt binder of the present invention was used, the result showed that the Marshall stability significantly exceeded that of a domestic cold asphalt. In particular, the dynamic stability was significantly higher than that of conventional combinations using the emulsified asphalt or cutback asphalt (Comparative Examples 1 and 2). Accordingly, the nonvolatile cold modified asphalt binder of the present invention is considered to be very suitable as a cold repair material.

2) KS F 2386 Tensile adhesive strength test for attachment surface of road pavement body (20° C., MPa)

TABLE 2

| | Item | Example 1 | Example 2 | Comparative Example 1 | Comparative Example 2 |
|---|---|---|---|---|---|
| Dry | Asphalt upper plate | 0.62 | 0.78 | 0.15 | 0.14 |
| | Concrete upper plate | 0.48 | 0.51 | 0.10 | 0.12 |
| Wet | Asphalt upper plate | 0.54 | 0.61 | 0 (impossible to measure) | 0.9 |
| | Concrete upper plate | 0.43 | 0.49 | 0 (impossible to measure) | 0.07 |

In the case of the mixture using the nonvolatile cold modified asphalt binder of the present invention, a main binder is based on an asphalt and showed excellent adhesion to the asphalt upper plate or concrete upper plate. On the other hand, in the case when the emulsified asphalt binder mixture or the cutback asphalt binder mixture was used in the wet asphalt upper plate or concrete upper plate, the adhesion was relatively very low due to the use of water-type emulsions and volatile solvents.

3) Checking of whether or not volatile components and inorganic binders are used and comparison of storage periods

TABLE 3

| Item | Example 1 | Example 2 | Comparative example 1 | Comparative example 2 |
|---|---|---|---|---|
| Volatile component | | | | o |
| Storage period | Two years or more | Two years or more | Three months | 3 to 5 hours after mixing |
| Inorganic binder | | | | o |

INDUSTRIAL APPLICABILITY

A nonvolatile cold recycled asphalt mixture including a nonvolatile cold recycled asphalt binder of the present invention may be used in pavement and repairing of roads using an asphalt upper plate or concrete upper plate, may be used to pave and repair a sidewalk, a bicycle road, or a walkway, and particularly may be used in pavement and repairing even in case of rain, such as a state where humidity is high or a moisture state, and in winter.

The invention claimed is:

1. A nonvolatile cold modified asphalt binder comprising:
    A) 0.1 to 30 wt % of at least one petroleum asphalt selected from a straight asphalt or a blown asphalt;
    B) 0.1 to 30 wt % of at least one native asphalt selected from gilsonite, glance pitch, and grahamite;
    C) 0.1 to 15 wt % of a rubber-modified-compound (RMC) polymer modifier which is a vinyl aromatic hydrocarbon-conjugated diene block copolymer including at least one of a styrene-butadiene block copolymer (SBS), a styrene-isoprene block copolymer (SIS), and a styrene-ethylene-butylene block copolymer (SEBS);
    D) 20 to 50 wt % of at least one process oil selected from paraffin oil, naphthenic oil, aromatic oil, natural oil, and mineral oil; and
    (E) 0.5 to 30 wt % of at least one adhesive strength enhancer selected from rosin esters, modified acryls, modified silicones, polyvinyl esters, and silicone resins,
    wherein the nonvolatile cold modified asphalt binder is manufactured via steps of:
    a) preparing the petroleum asphalt and the native asphalt by heating to 160 to 170° C.;
    b) adding the rubber-modified-compound polymer modifier of C) to the heated petroleum asphalt and native asphalt and performing stirring in a batch plant at a temperature of 170 to 180° C. for three hours or more, thus manufacturing a modified asphalt;
    c) adding the adhesive strength enhancer to the modified asphalt and performing stirring at a temperature of 170 to 180° C. for one hour or more;
    d) adding the process oil to the modified asphalt containing the adhesive strength enhancer obtained during step c) and performing stirring at a temperature of 170 to 180° C. for one hour or more; and
    e) cooling a mixture after step d).

2. A nonvolatile cold recycled asphalt mixture comprising:
    1 to 3 wt % of a nonvolatile cold modified asphalt binder;
    93 to 97 wt % of a recycled aggregate; and
    2 to 4 wt % of a filler,
    wherein the nonvolatile cold asphalt binder includes:
    0.1 to 30 wt % of at least one petroleum asphalt selected from a straight asphalt or a blown asphalt;
    0.1 to 30 wt % of at least one native asphalt selected from gilsonite, glance pitch, and grahamite;
    0.1 to 15 wt % of a rubber-modified-compound (RMC) polymer modifier which is a vinyl aromatic hydrocarbon-conjugated diene block copolymer including at least one of a styrene-butadiene block copolymer (SBS), a styrene-isoprene block copolymer (SIS), and a styrene-ethylene-butylene block copolymer (SEBS);
    20 to 50 wt % of at least one process oil selected from paraffin oil, naphthenic oil, aromatic oil, natural oil, and mineral oil; and
    0.5 to 30 wt % of at least one adhesive strength enhancer selected from rosin esters, modified acryls, modified silicones, polyvinyl esters, and silicone resins.

3. The nonvolatile cold recycled asphalt mixture of claim 2, wherein the nonvolatile cold recycled asphalt mixture is packed in a paper bag package, a paper box package, a tonne bag package, or a nonwoven-pack package.

4. The nonvolatile cold recycled asphalt mixture of claim 2, wherein the nonvolatile cold recycled asphalt mixture is applied to a sidewalk, a bicycle road, or a walkway.

* * * * *